(12) United States Patent
Culbertson et al.

(10) Patent No.: US 7,532,230 B2
(45) Date of Patent: May 12, 2009

(54) METHOD AND SYSTEM FOR COMMUNICATING GAZE IN AN IMMERSIVE VIRTUAL ENVIRONMENT

(75) Inventors: W. Bruce Culbertson, Palo Alto, CA (US); Thomas Malzbender, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1106 days.

(21) Appl. No.: 10/769,175

(22) Filed: Jan. 29, 2004

(65) Prior Publication Data

US 2005/0168402 A1 Aug. 4, 2005

(51) Int. Cl.
*H04N 7/14* (2006.01)
*G06T 13/00* (2006.01)

(52) U.S. Cl. .............. 348/14.08; 348/14.09; 348/14.16; 348/14.01; 709/204; 345/474

(58) Field of Classification Search ... 348/14.01–14.09, 348/14.1, 14.11, 41.13, 14.14, 14.15, 14.16; 345/473, 474, 619, 419, 420; 709/204, 205; 370/260, 261
See application file for complete search history.

(56) References Cited

U.S. PATENT DOCUMENTS

| 4,400,724 | A | 8/1983 | Fields | |
|---|---|---|---|---|
| 6,677,980 | B1 * | 1/2004 | Jeon | 348/14.16 |
| 6,771,303 | B2 * | 8/2004 | Zhang et al. | 348/14.16 |
| 6,806,898 | B1 * | 10/2004 | Toyama et al. | 348/14.16 |
| 7,139,767 | B1 * | 11/2006 | Taylor et al. | 707/102 |

FOREIGN PATENT DOCUMENTS

JP 2000-353248 12/2000

OTHER PUBLICATIONS

L-Q Xu, et al.; "True-View VideoConferencing System Through 3-D Impression of Telepresence"; BT Technol J vol. 17 No. 1, Jan. 1999; pp. 59-68.

Jim Gemmell, et al.; "Gaze Awareness For Video-Conferencing: A Software Approach"; IEEE Oct.-Dec. 2000; pp. 26-35.

Minoru Kobayashi et al-"Virtual Common Environment Which Aims a Communication of a Field: An Immersive Communication System Using High Realistic Sensation Display" (see below) No Date is available, Mrk.

Image Laboratory - vol. 13 No. 12 pp. 29-33.

Shouhei Sugawara et al - "Consideration of a Conversation Enviment Depending on High Detail Type Inner Space" (see below).

Information Processing Societies Study Report 1999 - vol. 99 No. 7 - pp. 67-72.

* cited by examiner

*Primary Examiner*—Melur Ramakrishnaiah

(57) ABSTRACT

A method of communicating gaze. Specifically, one embodiment of the present invention discloses a method of communicating gaze in an immersive virtual environment. The method begins by representing an immersive virtual environment on a monitor that is viewable by a viewing participant. The monitor displays a plurality of objects in the virtual environment. The physical gaze of the viewing participant is tracked to determine a physical direction of the physical gaze within a physical environment including the viewing participant. Thereafter, a viewed object is determined at which the viewing participant is gazing. Then, a virtual direction is determined between the viewing participant and the viewed object in the immersive virtual environment. A model of the viewing participant is rotated based on the physical and virtual directions to render a view of the viewing participant such that the viewing participant is facing the viewed object in the immersive virtual environment.

30 Claims, 7 Drawing Sheets

300A

400B

METHOD AND SYSTEM FOR COMMUNICATING GAZE IN AN IMMERSIVE VIRTUAL ENVIRONMENT

TECHNICAL FIELD

The present invention relates to the field of video communication within a shared virtual environment, and more particularly to a method and system for communicating gaze in an immersive virtual environment.

BACKGROUND ART

Video communication is an established method of collaboration between remotely located participants. In its basic form, a video image of a remote environment is broadcast onto a local monitor allowing a local user to see and talk to one or more remotely located participants. More particularly, immersive virtual environments attempt to simulate the experience of a face-to-face interaction for participants who are, in fact, geographically dispersed but are participating and immersed within the virtual environment.

The immersive virtual environment creates the illusion that a plurality of participants, who are typically remote from each other, occupy the same virtual space. Essentially, the immersive virtual environment consists of a computer model of a three-dimensional (3D) space, called the virtual environment. For every participant in the virtual environment, there is a 3D model to represent that participant. The models are either pre-constructed or reconstructed in real time from video images of the participants. The models have sufficient detail that it is possible to know, by looking at renderings of them, the direction of their gaze within the virtual environment. In addition to participants, there can be other objects that can be represented by 3D models within the virtual environment.

Every participant and object has a virtual pose that is defined by their corresponding location and orientation within the virtual environment. The participants are typically able to control their poses so that they can move around in the virtual environment. In addition, all the participant and object 3D models are placed, according to their virtual poses, in a 3D model of the virtual environment to make a combined 3D model. A view (e.g., an image) of the combined 3D model is created for each participant to view on their computer monitor. A participant's view is rendered using computer graphics from the point of view of the participant's virtual pose.

Various forms of non-verbal communication exist when communicating physically face-to-face that are also transferred when communicating in immersive virtual environments. For instance, gaze illustrates the direction in which a person looks, and can be an important non-verbal cue in conversation. Specifically, a speaker addresses a listener in a two-way conversation usually by directly looking at the listener. Conversely, when a person listens to another person, they usually look at them. As such, gaze conveys who is speaking to whom, and who is paying attention. Thus, gaze is useful to observers who are trying to follow and participate in a conversation.

One of the problems associated with communication in an immersive virtual environment in conventional methods and systems is the lack of eye contact between participants. Two orders of visual communication can be defined as a measure of effectively communicating eye contact, and/or gaze. The first order represents eye contact between two participants. The second order represents eye contact between two participants that is observed by a third participant. Conventional video communication systems fail to effectively communicate eye contact or gaze by failing to represent various combinations of first and second orders of communication.

In the first order, it is assumed that a first and a second participant each can see the other in their respective field-of-view in the virtual environment. That is, each of the participants cannot look at the other observed participant directly, but, instead looks at the image of the other participant on an associated monitor. As such, first order gaze is communicated if the second participant sees on an associated computer monitor a face-on, eye contact view of the first participant exactly when the first participant on his or her monitor is looking at the image of the second participant.

In the second order, it is assumed that there are three participants, a first participant, a second participant, and a third participant. Each of the participants cannot look at the other observed participant directly, but, instead looks at the image of the other participant on an associated monitor. In the second order, the first participant can see the second participant in his or her field of view (FOV) of the virtual environment. Also, the third participant can see the first participant and the second participant in his or her FOV of the virtual environment. Second order gaze is communicated when the third participant sees on a monitor the first participant looking at the second participant whenever the first participant on an associated monitor is looking at the image of the second participant.

As an example of the failure to communicate gaze on a first order, participants interact with a local monitor for communicative purposes instead of the recording camera that is positioned to capture a video image of the viewing participant. In this case, the recording camera is placed to the side of the monitor to avoid interference with views of the monitor. The monitor shows a video image of a remote participant to the viewing participant. Interest of the viewing participant is naturally focused primarily on the monitor for communication. As such, the local user directly interacts with the images of the remote participant on the monitor.

However, since the recording camera is not physically positioned at the location of interest (e.g., the remote participant on the monitor) of the viewing participant, the remote participant will not see a face-on view of the viewing participant. The viewing participant appears to be avoiding eye contact by gazing off in another direction, when in fact, the viewing participant is actually viewing the remote participant. Moreover, the same problem exists at the monitor of the local user. The local user also views a video stream of the remote participant that is not face-on. In such a system, the first order of effectively communicating gaze is not successfully performed.

As an example of the failure to communicate gaze on a second order, some conventional systems try to capture a video image of the viewing participant from the viewpoint of the center of the monitor. For instance, one system typically aims a camera through a small hole in a large monitor. Another system places semi-transparent mirrors between the monitor and the viewing participant. An eye-contact view is obtained of the viewing participant. However, all the remote participants see the same view of the viewing participant, even though the viewing participant may be viewing a particular remote participant on the local monitor. Thus, all the remote participants get the impression that the viewing participant is making eye contact with them. Such systems fail to effectively communicate gaze on a second order.

Therefore, previous methods of video communication were unable to satisfactorily provide for first and second orders of communicating gaze between participants of a virtual environment.

DISCLOSURE OF THE INVENTION

A method of communicating gaze. Specifically, one embodiment of the present invention discloses a method of communicating gaze in an immersive virtual environment. The method begins by representing an immersive virtual environment on a monitor that is viewable by a viewing participant. The monitor displays a plurality of objects in the virtual environment. The physical gaze of the viewing participant is tracked to determine a physical direction of the physical gaze within a physical environment including the viewing participant. Thereafter, a viewed object is determined at which the viewing participant is gazing. Then, a virtual direction is determined between the viewing participant and the viewed object in the immersive virtual environment. A model of the viewing participant is rotated based on the physical and virtual directions to render a view of the viewing participant such that the viewing participant is facing the viewed object in the immersive virtual environment.

BEST MODES FOR CARRYING OUT THE INVENTION

Figure 1A:
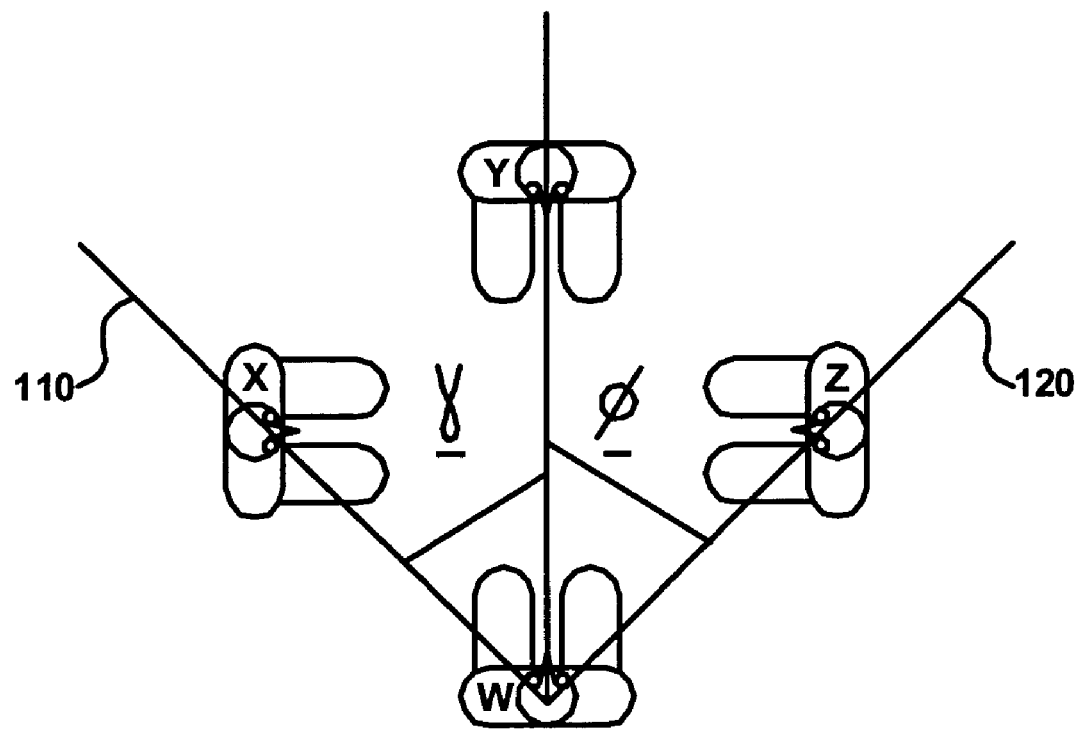
FIG. 1A is a diagram of an immersive virtual environment including four participants, in accordance with one embodiment of the present invention.

Reference will now be made in detail to the preferred embodiments of the present invention, a method of communicating gaze in an immersive virtual environment. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, game console, set-top box, mobile phone, and the like. This software program is operable for communicating gaze when generating real-time image rendering for video and audio communication. In one embodiment, the computer system includes a processor coupled to a bus and memory storage coupled to the bus. The memory storage can be volatile or non-volatile and can include removable storage media. The computer can also include a monitor, provision for data input and output, etc.

Accordingly, the present invention provides a method and system for communicating gaze in an immersive virtual environment. In particular, embodiments of the present invention are able to provide for first and second orders of communicating gaze between participants of an immersive virtual environment. Embodiments of the present invention are able to provide for communicating gaze between participants that are superior to the prior art methods that could not compensate for a camera that was off-display. In addition, other embodiments of the present invention are able to communicate gaze within an immersive virtual environment while using low cost, commodity monitors, rather than expensive monitors having a wide field-of-view as required in conventional systems. Also, embodiments of the present invention are able to communicate gaze within an immersive virtual environment by using a gaze tracking mechanism, and without requiring an intricate setup between a viewing participant and an associated viewing monitor, as required in conventional systems. Additionally, embodiments of the present invention are able to communicate gaze even though the field-of-view (FOV) of participants in the immersive virtual environment is different from the FOV of participants provided on a computer monitor of the immersive virtual environment.

An immersive virtual environment creates the illusion of a plurality of participants occupying the same virtual space, or environment. That is, given a plurality of participants who are typically remote from each other in a physical environment, an immersive virtual environment allows for the interaction of the participants within the virtual environment. In one embodiment, the immersive virtual environment is created by a computer model of a three-dimensional (3D) space.

Within the immersive virtual environment, for every participant, there is a 3D model to represent that participant. In one embodiment, the models are either pre-constructed or reconstructed in real time from video images of the participants. The video images can be generated from one or more cameras that surround a participant. Video streams of the images are generated in real-time from multiple perspectives. From these multiple video streams, various reconstruction methods can be implemented to generate a 3D model of the participant.

As such, the 3D models of the participants have sufficient detail that it is possible to know, by looking at renderings of them, the direction of their gaze. In addition to participants, there can be other objects in the virtual environment. The objects also have 3D model representations.

In the virtual environment, every participant and object has a virtual pose. The virtual pose comprises the location and orientation of the participant in the virtual environment. Participants are typically able to control their poses so that they can move around in the virtual environment.

All of the 3D model representations of the participants and objects are placed, according to their virtual poses, in the 3D model of the virtual environment model to make a combined 3D model. As such, the combined 3D model includes all the participants and the objects within the virtual environment.

Thereafter, a view (i.e. an image) of the combined model is created for each participant to view on their associated computer monitor. A participant's view is rendered using computer graphics from the point of view of the participant's virtual pose within the virtual environment.

FIG. 1A is an illustration of the interactions of participants within an immersive virtual environment 100A, in accordance with one embodiment of the present invention. In particular, FIG. 1A is a diagram illustrating how four participants would typically arrange themselves in the immersive virtual environment 100A. The four participants include participant W, participant X, participant Y, and participant Z. Angle $\gamma$ exhibits the angular spacing between participant X and participant Y within the view of participant W in the immersive virtual environment 100A. Also, angle $\phi$ exhibits the angular spacing between participant Y and participant Z within the view of participant W in the immersive virtual environment 100A.

A participant, e.g., participant W, would require a field of view of about 90 degrees to see all the other participants, as exhibited by lines 110 and 120 in FIG. 1A. Since the immersive virtual environment 100A is meant to mimic the real world and, since people in the real world see fields of view close to 180 degrees, this arrangement mimics a situation in which each participant can see all the other participants.

Figure 1B:
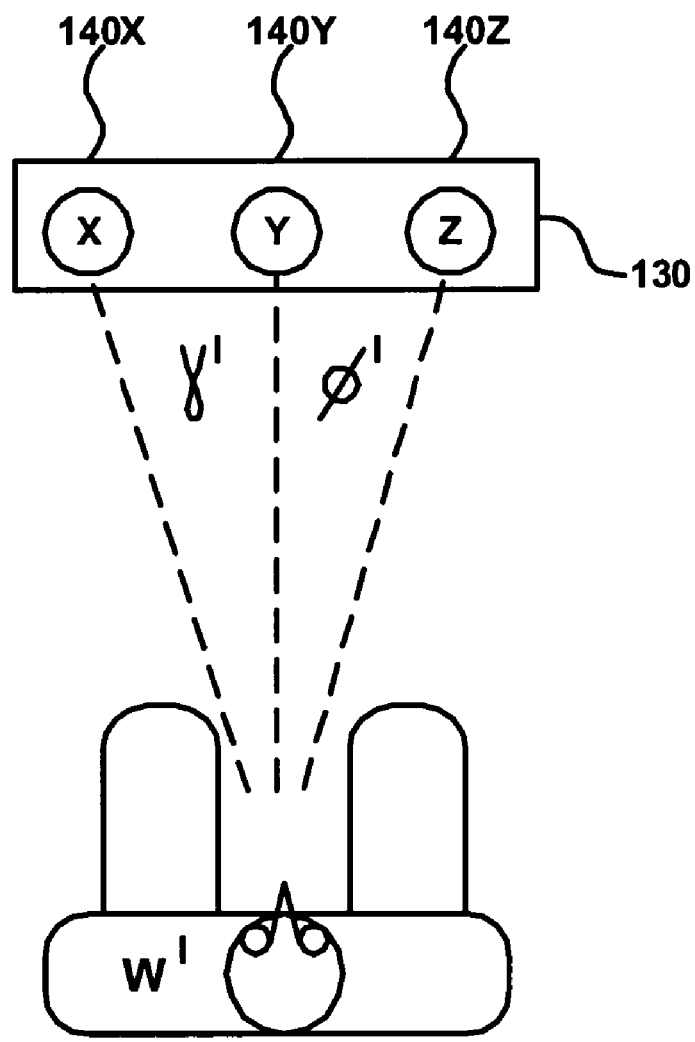
FIG. 1B is a diagram of the orientation of a participant and an associated monitor when viewing the immersive virtual environment of FIG. 1A that is capable of tracking gaze of the participant, in accordance with one embodiment of the present invention.

FIG. 1B is a top down view 100B of the participant W', wherein participant W' is the physical representation of virtual participant W of FIG. 1A, in accordance with one embodiment of the present invention. FIG. 1B illustrates how participant W would typically view the immersive virtual environment 100A on his or her monitor 130 in reality. Participant X is shown in location 140X on the monitor 130, participant Y is shown as an image 140Y on the monitor 130, and participant Z is also shown as an image 140Z on the monitor 130.

In addition, FIG. 1B illustrates the relation between the field-of-views of participants in the immersive virtual environment and in reality, in accordance with one embodiment of the present invention. Typical computer monitors (e.g., monitor 130) provide the viewer with a field of view of about 25 degrees to render the virtual environment 100A so that all the remote participants are visible. For example, in reality, angle $\gamma'$ exhibits the angular spacing between image 140X and image 140Y as viewed by participant W' within the physical world. Also, angle $\phi'$ exhibits the angular spacing between image 140Y and image 140Z as viewed by participant W' within the physical world.

As can be seen in the FIGS. 1A and 1B, the angles $\gamma$ and $\phi$ between participant W and the other participants X, Y and Z in the immersive virtual environment 100A are not equal to the corresponding angles $\gamma'$ and $\phi'$ between participant W' and the images 140X, 140Y, and 140Z of the remote participants on the monitor 130, in reality. In other words, $\gamma \neq \gamma'$ and $\phi \neq \phi'$. Specifically, the model of the participant W' is created in physical space, and so, will rotate by $\gamma'$ as W' looks from Y to X on his or her monitor 130. Once placed in the immersive virtual environment, however, if gaze is to be communicated correctly, the model of the participant W' must instead be rotated by $\gamma$. Therefore, in embodiments of the present invention, the rotation of the participant W' by $\gamma'$ must be removed and replaced by $\gamma$ when the model of the participant W' is inserted into the immersive virtual environment.

As such, embodiments of the present invention are capable of calculating the proper angles of direction within the physical environment and the immersive virtual environment of participant W' and performing the rotations so that the orientation and gaze of the participant W' is properly communicated within the immersive virtual environment. That is, even though the FOV within the immersive virtual environment is different from the FOV in reality, embodiments of the present invention are able to translate the orientation and gaze of the participants in reality to orientations and gaze of participants as they are represented in the immersive virtual environment. As such, embodiments of the present invention are capable of communicating gaze while allowing the FOV of participants in the immersive virtual environment to be independent of the FOV provided by a computer monitor in the physical environment, as will be described in full below. The angles between participants in the immersive virtual environment, and the corresponding angles between a viewing participant and the images of remote participants can be completely different, and yet, gaze is communicated correctly.

As a result, embodiments of the present invention are able to effectively communicate gaze of participants on a first and second order within the immersive virtual environment, where, as described previously, the two orders of visual communication can be defined as a measure of effectively communicating eye contact, and/or gaze. In summary, the first order represents eye contact between two participants in an immersive virtual environment. The second order is a correct representation of eye contact between two participants that is observed by a third participant within the immersive virtual environment.

Figure 2:
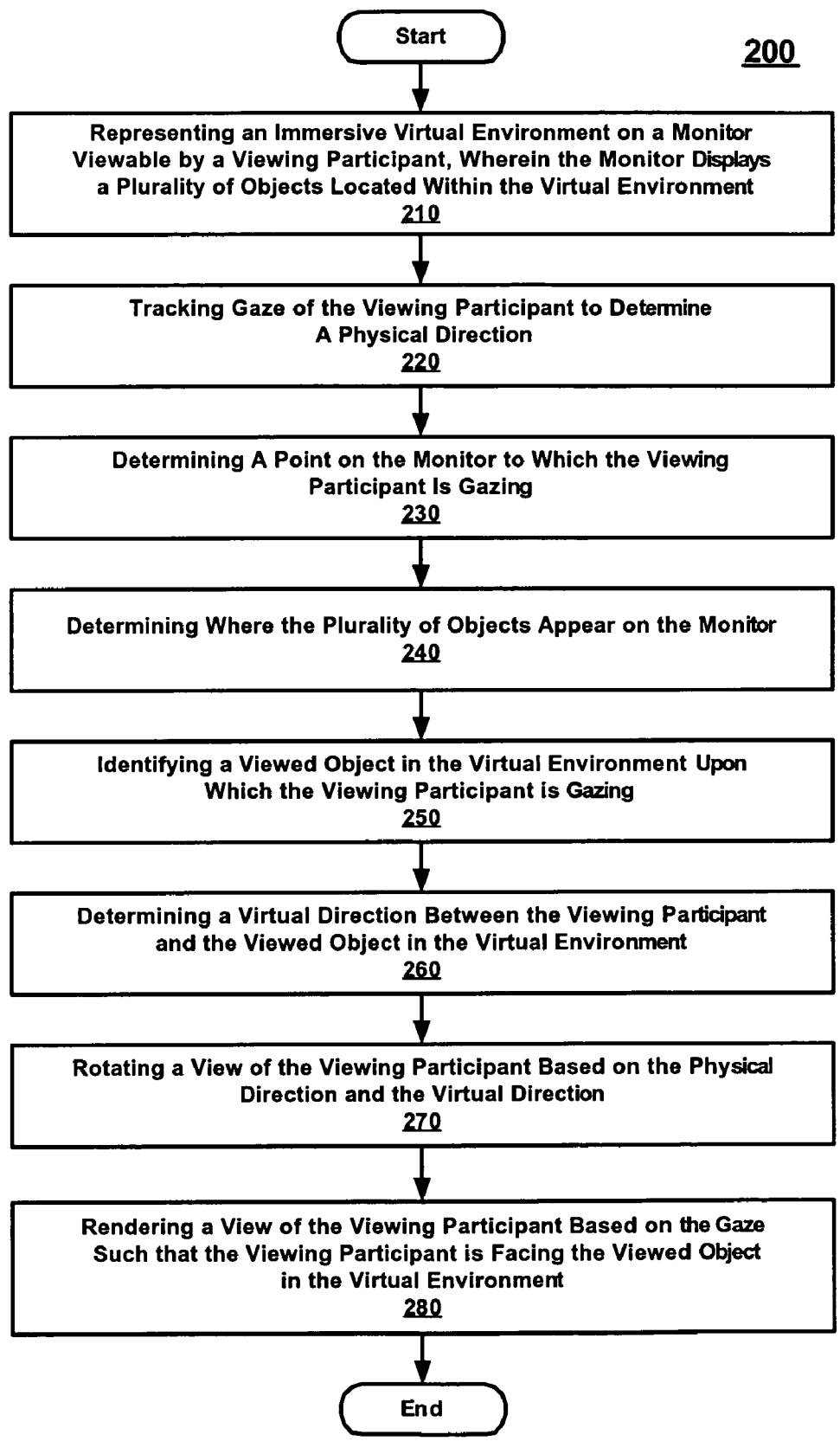
FIG. 2 is a flow diagram illustrating steps in a computer implemented method for communicating gaze in an immersive virtual environment, in accordance with one embodiment of the present invention.

The flow chart in FIG. 2 illustrates steps in a computer implemented method for communicating gaze within an immersive virtual environment, in accordance with one embodiment of the present invention. The immersive virtual environment is any three dimensional virtual environment within which representations of participants immerse themselves by interacting with objects, including other participants, within the immersive virtual environment. The immersive virtual environment is created so that all participants can virtually navigate and interact with other objects and participants within the virtual environment.

The present embodiment begins by representing the virtual environment on a monitor viewable by a viewing participant, at 210. The viewing participant is immersed within the virtual environment and can interact with other remote participants and objects within the virtual environment as seen on the monitor. The monitor displays a view of the virtual environment from the viewpoint of the viewing participant within the virtual environment. As such, the view of the virtual environment on the monitor is representative of what the viewing participant would see if he or she were actually present in the virtual environment.

The view of the virtual environment on the monitor comprises a plurality of objects that are located within the virtual environment. The plurality of objects is displayed on the monitor. While the present embodiment discloses a plurality of objects generally within a virtual environment, other embodiments of the present invention are well suited to particular representations of objects. For example, in one embodiment, the plurality of objects is a plurality of remote participants that interact with each other and the viewing participant within the immersive virtual environment.

At 220, the present embodiment continues by tracking the physical gaze of the viewing participant to determine a physical direction of the gaze within a physical environment that includes, in part, the viewing participant and the monitor. The gaze of the viewing participant is directed towards the monitor upon which the immersive virtual environment is displayed. More specifically, the gaze is directed to objects located within the immersive virtual environment as displayed on the monitor. That is, as the participant looks at his computer monitor, gaze tracking is used to determine the physical direction of the participant's gaze. In one embodiment, the direction is expressed as an angle relative to some physical coordinate system, and can be representative of a horizontal component of the direction. Other embodiments are well suited to including vertical components for the direction.

While embodiments of the present invention describe directing the gaze toward objects located within the immersive virtual environment as displayed on a monitor, other embodiments of the present invention are well suited to directing the gaze towards a particular point in space located with the immersive virtual environment. That is, the object represents a particular point in a coordinate space within the immersive virtual environment.

At 230, the present embodiment determines a point on the monitor to which the viewing participant is gazing. That is, knowing the direction towards which the viewing participant is gazing and the relative locations of the viewing participant and the monitor, it is possible to determine a point on the monitor where the viewing participant is looking.

At 240, the present embodiment determines where the plurality of objects in the immersive virtual environment appear on the monitor. When standard computer graphics is used to render a 3D model to a two-dimensional (2D) image, it is possible to determine where objects in the 3D model will appear in the 2D image. Because the image of the immersive virtual environment on the monitor is created by computer graphics, the locations of the objects from the immersive virtual environment on the monitor can be determined.

Specifically, the present embodiment previously has created the immersive virtual environment. As such, the present embodiment understands all of the objects, and their corresponding locations within a coordinate space of the immersive virtual environment. Further, the present embodiment is capable of displaying the objects in the immersive virtual environment from any viewpoint in the immersive virtual environment on a monitor. Thus, the present embodiment is capable of understanding the objects in the immersive virtual environment that are displayed on the monitor, and understands the physical locations associated with those objects on a viewing surface of the monitor.

At 250, the present embodiment continues by determining a viewed object towards which the viewing participant is gazing. Determining the viewed object is possible since the present embodiment understands the relationship between objects in the immersive virtual environment, their corresponding representations on the monitor, and the locations of those objects on a planar viewing surface of the monitor.

At 260, the present embodiment continues by determining a virtual direction between the viewing participant and the viewed object in the immersive virtual environment. That is, in the immersive virtual environment, the viewed object will be in some direction relative to a coordinate system in the immersive virtual environment from the viewing participant.

At 270, the present embodiment rotates a 3D model of the viewing participant based on the physical direction and the virtual direction when the 3D model of the viewing participant is placed in the combined 3D model of the immersive virtual environment. That is, the 3D model of the viewing participant is rotated to exhibit the actual gaze of the viewing participant, such that the viewing participant is facing the viewed object in the immersive virtual environment.

Thereafter, the 3D model of the viewing participant is inserted into a 3D model of the immersive virtual environment to create a combined model that includes the 3D models of the viewing participant and the virtual environment.

At 280, the present embodiment continues by rendering a view of the viewing participant based on the physical direction and virtual direction of the viewing participant. In this way, the 3D model of the viewing participant is inserted into a 3D model of the immersive virtual environment, such that, the resulting view of the viewing participant shows the viewing participant facing the viewed object.

Figure 3A:
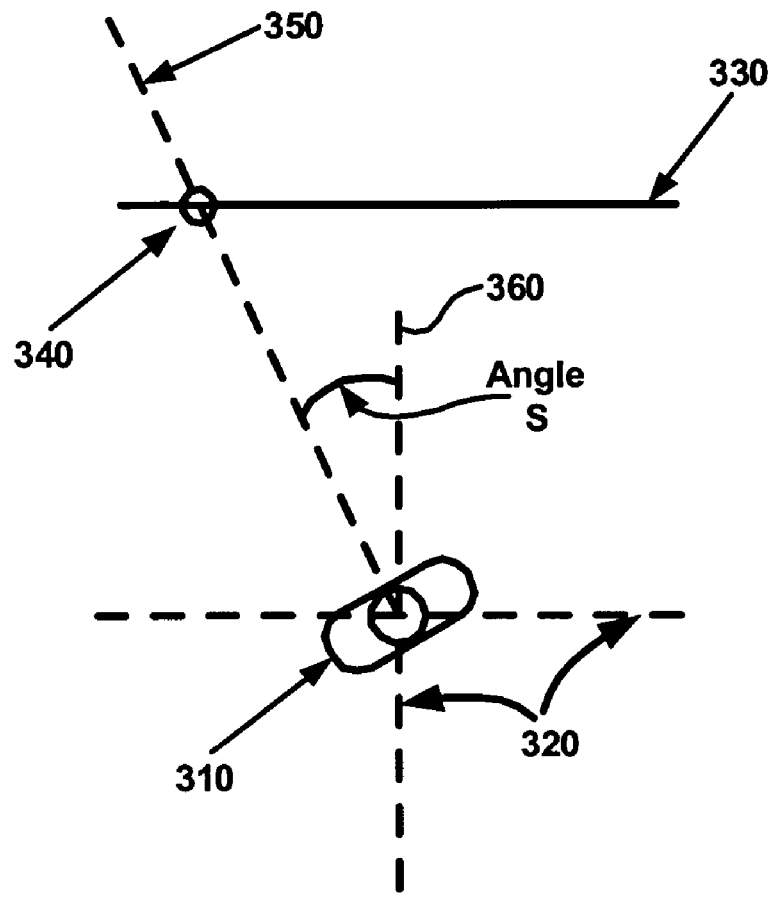
FIG. 3A is a top down view 300A of a viewing participant 310 within a physical environment illustrating the direction of gaze of the viewing participant 310, in accordance with one embodiment of the present invention.
Figure 3B:
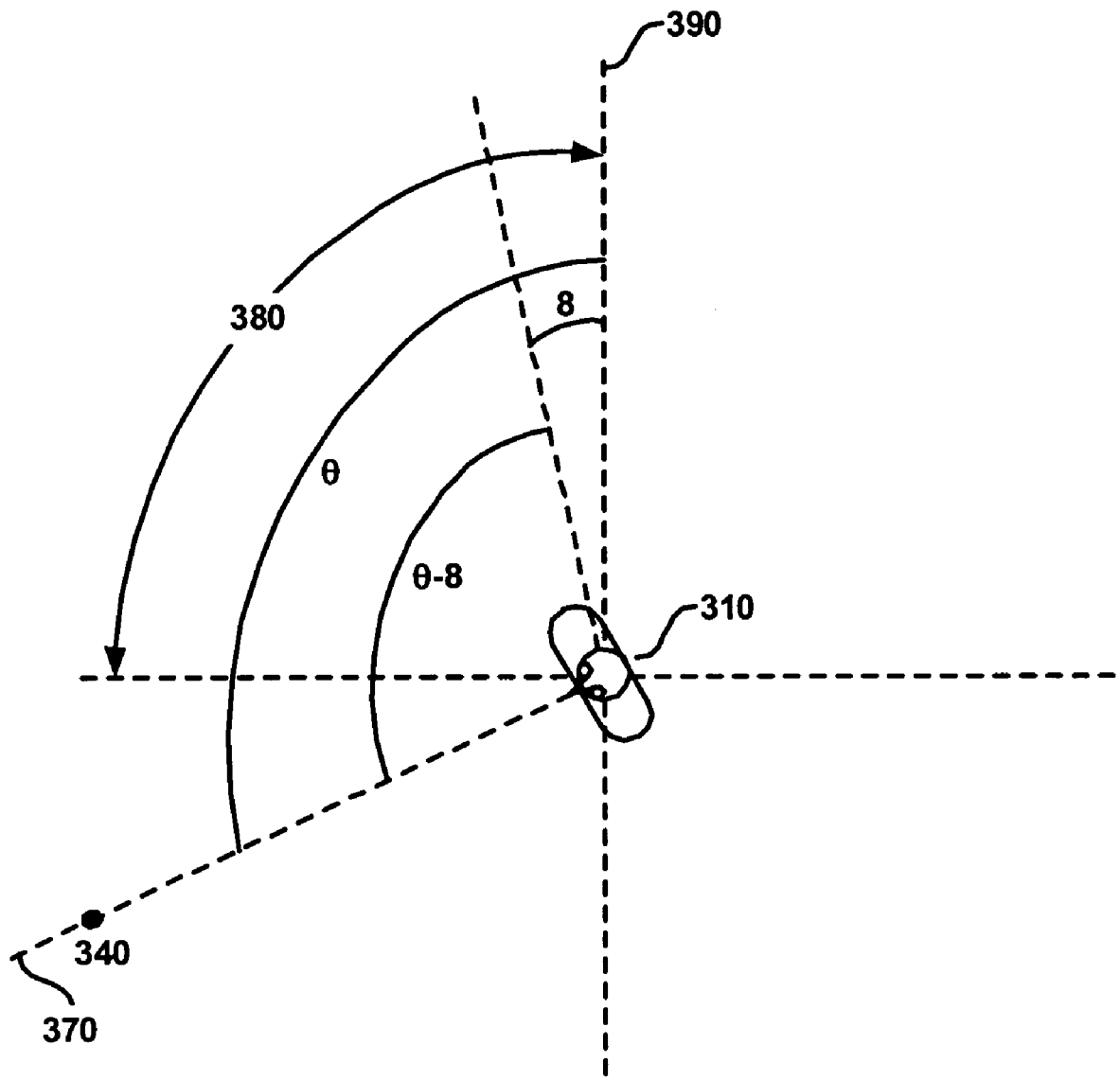
FIG. 3B illustrates a view of a viewing participant 310 of FIG. 3A within a virtual environment 300B illustrating the rotation of the 3D model of the viewing participant 310 to portray the correct direction of gaze of the viewing participant 310, in accordance with one embodiment of the present invention.

FIGS. 3A and 3B illustrate the process of rotating the 3D model of the viewing participant when inserting it into the immersive virtual environment to correctly represent gaze, in accordance with embodiments of the present invention. More particularly, FIG. 3A illustrates a physical gaze of a viewing participant within a physical environment, and FIG. 3B illustrates the representative virtual gaze of the viewing participant within the immersive virtual environment.

Specifically, FIG. 3A is a top down view 300A of a viewing participant 310 within a physical environment illustrating the physical direction of gaze of the viewing participant 310, in accordance with one embodiment of the present invention. In the physical environment, the viewing participant 310 views a monitor 330. In particular, the viewing participant 310 views an object 340 on the monitor 330. As shown in FIG. 3A, the physical direction of the gaze of the viewing participant 310 is expressed as an angle $\delta$ relative to some physical coordinate system 320. Specifically, the angle $\delta$ is determined from line 350 that is drawn between the viewing participant 310 and the object 340 appearing on the monitor, and the line 360 that is a reference direction in the physical coordinate system. The angle $\delta$ expresses just the horizontal component of the direction, in the present embodiment. However, other embodiments of the present invention are well suited to the illustration of the direction of gaze to include the vertical component.

In the present embodiment, any gaze tracking mechanism can be implemented to determine locations on the monitor towards which the gaze of the viewing participant is directed. That is, the gaze tracking mechanism is capable of estimating the direction $\delta$ towards which the gaze of the viewing participant is directed. For example, one gaze tracking mechanism includes remote eye-tracking systems that employ one or more light sources to stimulate a response in the pupil of the eye. This response is used for tracking the pupil in various eye-tracking systems.

Specifically, knowing the angle $\delta$ and the location of the viewing participant 310 in relation to the monitor 330, it is possible to determine the point on the monitor where the viewing participant 310 is looking. In particular, when standard computer graphics are used to render a 3D model to a 2D image, it is straightforward to determine where objects in the 3D model will appear in the image. As described previously, because the image of the virtual environment on the monitor 330 is created by computer graphics, the locations can be determined where the objects from the virtual environment appear on the monitor. As a result, if the viewing participant is looking at the image on his or her monitor of an object (or another participant) in the virtual environment, then the viewed object can be identified.

FIG. 3B illustrates a view of a viewing participant 310 of FIG. 3A within an immersive virtual environment 300B illustrating the rotation of the 3D model of the viewing participant 310 to portray the correct direction of gaze of the viewing participant 310, in accordance with one embodiment of the present invention. In the immersive virtual environment 300B, the viewed object 340 will be in some direction along line 370 and angle θ from the viewing participant 310, relative to the coordinate system 380 of the immersive virtual environment 300B. Angle θ also represents the virtual pose of the viewing participant 310 when properly communicating gaze.

In one implementation, the 3D model of the viewing participant 310 is reconstructed relative to some physical coordinate system 320 and then is inserted into the virtual environment 300B such that the physical reference direction 360 coincides with the virtual reference direction 390. In such a case, if the viewing participant looked at the image of the object 340 on his or her monitor 330, then the physical gaze direction would be δ relative to the physical reference direction. After insertion of the 3D model of the viewing participant 310 into the virtual environment 300B, the gaze would be δ relative to the physical reference direction. After insertion of the 3D model of the viewing participant 310 into the virtual environment 300B, the gaze would be δ relative to the reference direction 390 in the virtual coordinate system. If the model 310 of the viewing participant is rotated an amount −δ, then the model 310 will gaze in the reference direction 390 in the virtual coordinate system. Subsequently, if the 3D model 310 of the viewing participant is rotated an amount θ, then the gaze direction of the viewing participant model 310 will be θ. As such, the model 310 of the viewing participant will face the viewed object 340. In summary, the 3D model 310 of the viewing participant must be rotated by the angel θ minus δ(θ−δ) when placed in the virtual environment 300B to properly portray a gaze towards the viewed object 340. The angle θ is the orientation part of the viewing participant's virtual pose.

The rendered view of the viewing participant is capable of communicating gaze effectively on both first and second orders. Regarding the first order of communicating gaze, in FIG. 3B, the viewed object 340, such as, a viewed participant, remotely located in the virtual environment 300B, is presented with a face-on view of the viewing participant 310. That is, when a view of the combined model of the immersive virtual environment is created for the viewed object, the combined model is rendered from the viewed object's location in the immersive virtual environment. Since the viewing participant has been oriented to face that location in virtual space, the viewed object will see a face-on, eye-contact view of the viewing participant. Hence, first-order eye contact is achieved.

Also, the present embodiment is capable of generating a rendered view of the viewing participant that effectively communicates a second order of communicating gaze. Supposing there is a third participant somewhere in the immersive virtual environment. In addition, suppose the viewed object and the viewing participant are rendered to the viewpoint of the third participant. Since the viewing participant has been oriented to face the viewed object, any rendering of the viewing participant and the viewed object, including a rendering to a viewpoint of the third participant, will show the viewing participant facing the viewed object. Hence, second-order eye contact is also achieved.

In one embodiment, the rendered view of the viewing participant is generated by applying a reconstruction technique to a plurality of real-time video streams of the viewing participant. That is, a 3D model of the viewing participant is reconstructed from the real-time video streams of the viewing participant. In this manner, a more realistic representation of the participants is presented within an immersive virtual environment, such as, a virtual conference room. Various reconstruction methods can be implemented in embodiments of the present invention. For example, one method is disclosed in "Image-based Visual Hulls," Matusik et al., SIGGRAPH 2000, pp. 369, 374.

In another embodiment, instead of providing real-time realistic representations of the viewing participant, the 3D model is pre-existing. For example, pre-existing cartoon-like avatars can represent participants in the virtual environment. The cartoon-like avatar can be designed with sufficient detail so that a direction of their view within the virtual environment can be portrayed.

In still another approach, new-view synthesis techniques can be used to render a viewing participant within an immersive virtual environment. New view synthesis techniques are capable of rendering objects to arbitrary viewpoints, and may or may not create a 3D model as an intermediate step. In this approach, the viewing participant is rendered, using new view synthesis, to exactly the same viewpoint as previously described to create a 2D image of the participant. The immersive virtual environment may be rendered separately to create a 2D virtual environment image. The 2D image of the participant can then be composited with the 2D virtual environment image to create an image that is identical to the previously described rendering of a 3D combined model.

In another embodiment, the virtual representation of the gaze of the viewing participant is locked to the viewed object to minimize hysterisis effects, such as, eye jitter. Specifically, the virtual representation of the gaze is locked on the viewed object until the viewing participants looks far enough away from the viewed object as portrayed on the monitor, or looks away long enough from the viewed object as portrayed on the monitor.

Figure 4A:
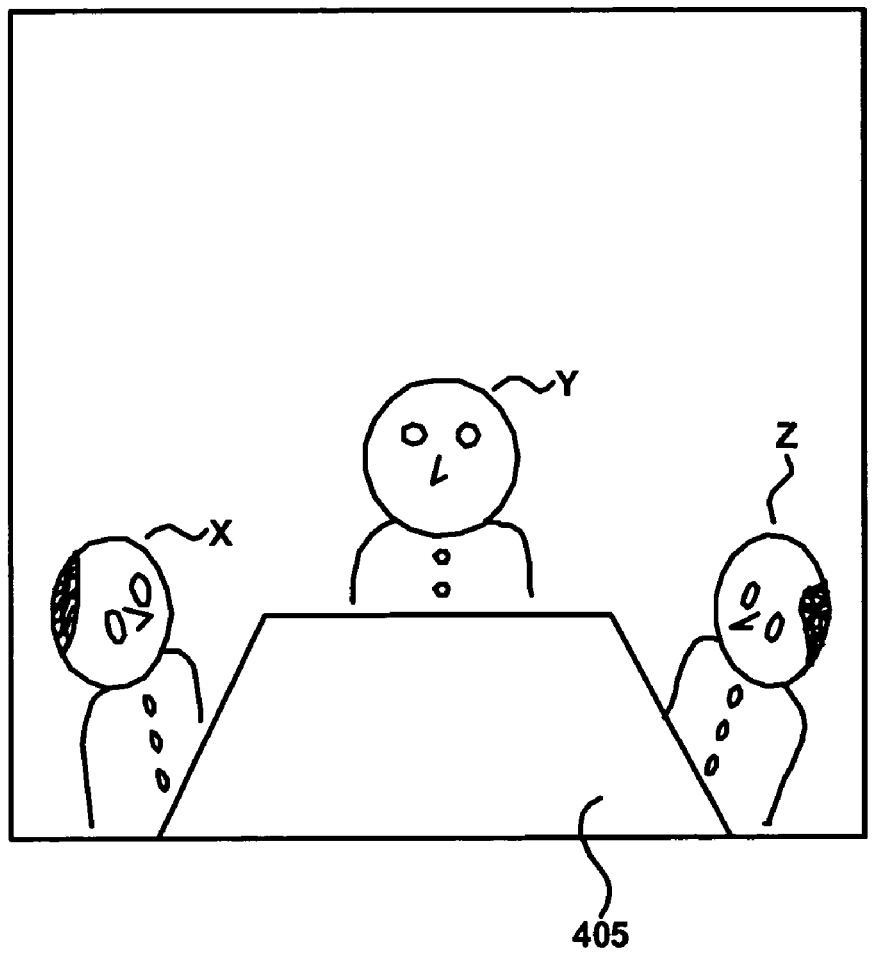
FIG. 4A is a diagram of a view of an immersive virtual environment to illustrate one layout of participants, in accordance with one embodiment of the present invention.
Figure 4B:
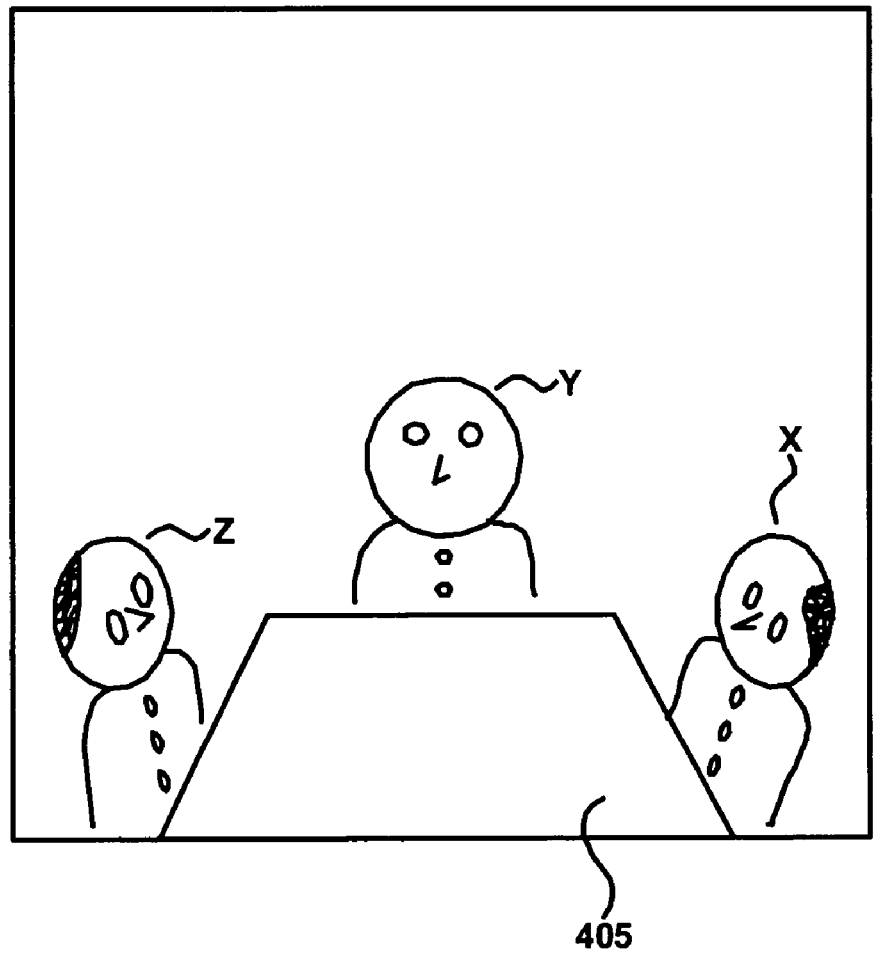
FIG. 4B is a diagram of a view of an immersive virtual environment to illustrate the varying layouts of participants of FIG. 4A depending on which virtual environment is selected, in accordance with one embodiment of the present invention.

In accordance with one embodiment of the present invention, various geometric layouts of a plurality of participants can be generated for the same communication session. That is, for example, the location of the viewing participant in relation to an observing participant may vary depending on which geometric layout is chosen. For example, FIG. 4A is a diagram illustrating a view 400A as seen by participant W' of FIG. 1B through a monitor. In FIG. 4A, the participants X, Y, and Z are viewed seated around a table 405 in a first geometric layout. FIG. 4B is a diagram illustrating a different view 400B as seen by participant W' of FIG. 1B through a monitor. The different view 400B illustrates a second geometric layout of the participants. That is, the placement of the viewed participants in the virtual environment has changed between the view 400A and 400B of the immersive virtual environment. For instance, in view 400A, participants X, Y, and Z are viewed from left to right. However, in view 400B, participants Z, X, and Y are viewed from left to right. Using the methods of the present invention to include FIG. 2, these multiple geometric layouts can simultaneously communicate gaze correctly.

While the methods of embodiments illustrated in flow chart 200 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The preferred embodiment of the present invention, a method for communicating gaze within an immersive virtual environment, is thus described. While the present invention has been described in particular embodiments, it should be appreciated that the present invention should not be construed as limited by such embodiments, but rather construed according to the below claims.

What is claimed is:

1. A method of communicating gaze, comprising:
    representing an immersive virtual environment on a monitor viewable by a viewing participant, said monitor displaying a plurality of objects located within said immersive virtual environment;
    tracking a physical gaze of said viewing participant to determine a physical direction of said physical gaze;
    determining a viewed object on said monitor at which said viewing participant is gazing;
    determining a virtual direction between said viewing participant and said viewed object in said immersive virtual environment;
    rotating a model of said viewing participant based on said physical direction and said virtual direction; and
    rendering a view of said viewing participant based on said physical gaze such that said viewing participant is facing said viewed object in said immersive virtual environment.

2. The method of claim 1, wherein said tracking physical gaze further comprises:
    determining said physical direction in a physical coordinate system of a physical environment including said monitor and said viewing participant.

3. The method of claim 1, wherein said determining a virtual direction further comprises:
    determining said virtual direction in a virtual coordinate system of said immersive virtual environment.

4. The method of claim 1, wherein said determining a viewed object further comprises:
    determining a plurality of object locations of said plurality of objects on a viewing surface of said monitor;
    determining a viewing location on said viewing surface towards which said viewing participant is physically gazing; and
    assigning said physical gaze of said viewing participant to said viewed object when said viewing location corresponds to one of said plurality of object locations.

5. The method of claim 1, wherein said rendering a view further comprises:
    reconstructing said model in three dimensions (3D) of said viewing participant;
    inserting said model into another model in 3D of said immersive virtual environment; and
    rotating said model of said viewing participant to exhibit said physical gaze, such that said viewing participant is facing said viewed object.

6. The method of claim 1, wherein said rendering a view further comprises:
    rendering said view of said viewing participant such that said viewing participant is making eye contact with said object in said immersive virtual environment.

7. The method of claim 1, wherein said rotating a model further comprises:
    converting a physical, angular rotation of said physical gaze associated with said viewing participant to generate a corresponding virtual rotation of said viewing participant such that said viewing participant is facing said object in said immersive virtual environment.

8. The method of claim 1, wherein said rendering a view further comprises:
    rendering said view from a perspective associated with the location of said viewed object within a coordinate system of said virtual environment to be displayed to said viewed object by applying said new view synthesis technique, wherein said viewing participant appears to be looking at said viewed object by looking out from another monitor viewable by said viewed object.

9. The method of claim 1, wherein said rendering a view further comprises:
    generating a video image stream in real-time for said view of said viewing participant within said immersive virtual environment to be displayed at another monitor viewable by an observing object that is not associated with said viewed object, wherein said viewing participant appears to be looking at said object within said immersive virtual environment as displayed at said another monitor.

10. The method of claim 1, wherein said viewed object comprises another participant in said immersive virtual environment.

11. The method of claim 1, wherein said immersive virtual environment comprises an environment conducive for meetings between a plurality of participants.

12. A method of communicating gaze, comprising:
    representing an immersive virtual environment on a monitor viewable by a viewing participant, said monitor displaying a plurality of remote participants located within said virtual video conferencing environment;
    tracking physical gaze of said viewing participant to determine a physical direction of said physical gaze;
    determining a viewed remote participant on said monitor at which said viewing participant is gazing;
    determining a virtual direction between said viewing participant and said viewed remote participant in said immersive virtual environment;
    rotating a model of said viewing participant based on said physical direction and said virtual direction; and
    rendering a view of said viewing participant based on said physical gaze by applying a reconstruction technique to a plurality of real-time video streams of said viewing participant such that said viewing participant is facing said viewed remote participant in said immersive virtual environment, wherein said plurality of real-time video streams is captured from a plurality of sample viewpoints.

13. The method as described in claim 12, wherein said virtual environment is used to implement video conferencing between said viewing participant and said plurality of remote participants.

14. The method of claim 12, wherein said representing an immersive virtual environment further comprises:
    creating said virtual environment in three dimensions;
    displaying said virtual environment from a viewpoint of said viewing participant on said monitor.

15. The method of claim 12, wherein said determining a viewed remote participant further comprises:
    determining a plurality of locations of said plurality of observing participants on a viewing surface of said monitor;
    determining a viewing location on said viewing surface towards which said viewing participant is physically gazing; and
    assigning said physical gaze of said viewing participant to said viewed remote participant when said viewing location corresponds to one of said plurality of locations.

16. The method of claim 12, wherein said rendering a view further comprises:
rendering said view of said viewing participant such that said viewing participant is making eye contact with said viewed remote participant in said virtual environment.

17. The method of claim 12, further comprising:
locking a representation of said physical gaze for said viewing participant in said immersive virtual environment to said viewed remote participant.

18. The method of claim 17, further comprising;
locking said representation until it is determined that said viewing participant is looking away from said viewed remote participant on said monitor.

19. The method of claim 12, further comprising:
rendering said view of said viewing participant within at least one alternative virtual environment when displayed to another monitor viewable by at least one of said plurality of remote participants, wherein a first geometric layout of said viewing participant and said plurality of remote participants in said virtual environment is different from a second geometric layout of said viewing participant and said plurality of remote participants in said alternative virtual environment.

20. A computer-readable medium comprising computer-executable instructions for performing a method of communicating gaze, comprising:
representing an immersive virtual environment on a monitor viewable by a viewing participant, said monitor displaying a plurality of objects located within said immersive virtual environment;
tracking a physical gaze of said viewing participant to determine a physical direction of said physical gaze;
determining a viewed object on said monitor at which said viewing participant is gazing;
determining a virtual direction between said viewing participant and said viewed object in said immersive virtual environment;
rotating a model of said viewing participant based on said physical direction and said virtual direction; and
rendering a view of said viewing participant based on said physical gaze such that said viewing participant is facing said viewed object in said immersive virtual environment.

21. The computer-readable medium of claim 20, wherein said tracking physical gaze in said method further comprises:
determining said physical direction in a physical coordinate system of a physical environment including said monitor and said viewing participant.

22. The computer-readable medium of claim 20, wherein said determining a virtual direction in said method further comprises:
determining said virtual direction in a virtual coordinate system of said immersive virtual environment.

23. The computer-readable medium of claim 20, wherein said determining a viewed object in said method further comprises:
determining a plurality of object locations of said plurality of objects on a viewing surface of said monitor;
determining a viewing location on said viewing surface towards which said viewing participant is physically gazing; and
assigning said physical gaze of said viewing participant to said viewed object when said viewing location corresponds to one of said plurality of object locations.

24. The computer-readable medium of claim 20, wherein said rendering a view in said method further comprises:
reconstructing said model in three dimensions (3D) of said viewing participant;
inserting said model into another model in 3D of said immersive virtual environment; and
rotating said model of said viewing participant to exhibit said physical gaze, such that said viewing participant is facing said viewed object.

25. The computer-readable medium of claim 20, wherein said rendering a view in said method further comprises:
rendering said view of said viewing participant such that said viewing participant is making eye contact with said object in said immersive virtual environment.

26. The computer-readable medium of claim 20, wherein said rotating a model in said method further comprises:
converting a physical, angular rotation of said physical gaze associated with said viewing participant to generate a corresponding virtual rotation of said viewing participant such that said viewing participant is facing said object in said immersive virtual environment.

27. The computer-readable medium of claim 20, wherein said rendering a view in said method further comprises:
rendering said view from a perspective associated with the location of the viewed object within a coordinate system of said immersive virtual environment to be displayed to said viewed object by applying said new view synthesis technique, wherein said viewing participant appears to be looking at said viewed object by looking out from another monitor viewable by said viewed object.

28. The computer-readable medium of claim 20, wherein said rendering a view in said method further comprises:
generating a video image stream in real-time for said view of said viewing participant within said immersive virtual environment to be displayed at another monitor viewable by an observing object that is not associated with said viewed object, wherein said viewing participant appears to be looking at said object within said immersive virtual environment as displayed at said another monitor.

29. The computer-readable medium of claim 20, wherein said viewed object comprises another participant in said immersive virtual environment.

30. The computer-readable medium of claim 20, wherein said immersive virtual environment comprises an environment conducive for meetings between a plurality of participants.

* * * * *

UNITED STATES PATENT AND TRADEMARK OFFICE
CERTIFICATE OF CORRECTION

| | |
|---|---|
| PATENT NO. | : 7,532,230 B2 |
| APPLICATION NO. | : 10/769175 |
| DATED | : May 12, 2009 |
| INVENTOR(S) | : W. Bruce Culbertson et al. |

It is certified that error appears in the above-identified patent and that said Letters Patent is hereby corrected as shown below:

In column 12, line 54, in Claim 14, after "dimensions;" insert -- and --.

Signed and Sealed this

Seventeenth Day of November, 2009

David J. Kappos
*Director of the United States Patent and Trademark Office*